United States Patent
Kruglick (10) Patent No.: US 9,304,795 B2
(45) Date of Patent: Apr. 5, 2016

(54) FUNCTION-TARGETED VIRTUAL MACHINE SWITCHING

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 192 days.

(21) Appl. No.: 13/977,670

(22) PCT Filed: Jan. 15, 2013

(86) PCT No.: PCT/US2013/021603
§ 371 (c)(1),
(2) Date: Jun. 28, 2013

(87) PCT Pub. No.: WO2014/112981
PCT Pub. Date: Jul. 24, 2014

(65) Prior Publication Data
US 2014/0359778 A1 Dec. 4, 2014

(51) Int. Cl.
*G06F 9/455* (2006.01)
*G06F 21/57* (2013.01)

(52) U.S. Cl.
CPC ........ *G06F 9/45533* (2013.01); *G06F 9/45558* (2013.01); *G06F 21/577* (2013.01); *G06F 2009/45591* (2013.01)

(58) Field of Classification Search
CPC .............. G06F 21/577; H04L 63/1433; H04L 63/1416; H04L 63/20; H04L 63/1408
See application file for complete search history.

(56) References Cited

U.S. PATENT DOCUMENTS

| 7,802,050 | B2 | 9/2010 | Savagaonkar et al. | |
|---|---|---|---|---|
| 8,341,626 | B1 * | 12/2012 | Gardner | G06F 9/4856 718/1 |
| 8,505,097 | B1 * | 8/2013 | Juels | G06F 21/552 713/183 |
| 8,813,240 | B1 * | 8/2014 | Northup | G06F 21/554 726/22 |
| 8,839,004 | B1 * | 9/2014 | Bennett et al. | 713/193 |
| 2003/0044003 | A1 * | 3/2003 | Chari | G06F 21/556 380/28 |
| 2004/0010785 | A1 | 1/2004 | Chauvel et al. | |
| 2007/0171921 | A1 | 7/2007 | Wookey et al. | |

(Continued)

FOREIGN PATENT DOCUMENTS

JP 2006059052 A 3/2006

OTHER PUBLICATIONS

Varadarajan et al., Scheduler-based Defenses against Cross-VM Side-channels.*

(Continued)

*Primary Examiner* — Peter Poltorak
*Assistant Examiner* — Huan V Doan
(74) *Attorney, Agent, or Firm* — Turk IP Law, LLC (57) ABSTRACT

Technologies are provided for function-targeted virtual machine switching. In some examples, function usage times on a virtual machine (VM) may be profiled by a virtual machine manager (VMM) and used to manage VM switching in order to preferentially switch VMs during specific targeted functions. The targeted functions and/or VM switching preferences may be adjusted over time in order to provide switching unpredictability, for example to frustrate side-channel attackers by forcing the attackers to gather data for much longer periods of time (e.g., weeks or months) if they want to detect or attack.

16 Claims, 7 Drawing Sheets

(56) References Cited

U.S. PATENT DOCUMENTS

| | | | |
|---|---|---|---|
| 2008/0123446 A1* | 5/2008 | Pickles | 365/194 |
| 2008/0235769 A1 | 9/2008 | Purcell et al. | |
| 2010/0115512 A1* | 5/2010 | Sakai | 718/1 |
| 2010/0242045 A1 | 9/2010 | Swamy et al. | |
| 2010/0246808 A1 | 9/2010 | Hisakado et al. | |
| 2010/0269171 A1 | 10/2010 | Raz et al. | |
| 2011/0022812 A1 | 1/2011 | Van Der et al. | |
| 2011/0023114 A1 | 1/2011 | Diab et al. | |
| 2011/0078797 A1 | 3/2011 | Beachem et al. | |
| 2011/0099267 A1 | 4/2011 | Suri et al. | |
| 2011/0179417 A1 | 7/2011 | Inakoshi | |
| 2011/0264939 A1 | 10/2011 | Wong et al. | |
| 2012/0185848 A1 | 7/2012 | Devarakonda et al. | |
| 2013/0212709 A1* | 8/2013 | Tucker | G06F 21/55 726/29 |

OTHER PUBLICATIONS

Kadloor et al., Mitigating Timing based Information Leakage in Shared Schedulers, Infocom, 2012 Proceedings IEEE.*

Ahmed, S., et al., "ETS (Efficient, Transparent, and Secured) self-healing service for pervasive computing applications," International Journal of Network Security, vol. 4, No, 3, pp. 271-281 (May 2007).

Iyer, R., et al., "Virtual platform architectures for resource metering in datacenters," ACM SIGMETRIC Performance Evaluation Review, vol. 37, No. 2, pp. 89-90 (Sep. 2009).

Kadloor, S., et al., "Mitigating timing based information leakage in shared schedulers," INFOCOM, 2012 Proceedings IEEE, pp. 1044-1052 (Mar. 25-30, 2012).

Kaiser G., et al., "An Approach to Autonomizing Legacy Systems" Workshop on Self Healing Adaptive and Self-Systems, pp. 1-6 (Jun. 2002).

Mishra, A. K., et al., "Towards characterizing cloud backend workloads: insights from Google compute clusters," ACM SIGMETRICS Performance Evaluation Review, vol. 37, No. 4, pp. 34-41 (Mar. 2010).

Reves, J., and Panchen, S., "Traffic monitoring with packet-based sampling for defense against security threats," InMon Technology Whitepaper, pp. 1-9 (2002).

Tatsubori, M., et al., "A bytecode translator for distributed executon of 'legacy' Java sofware"ECOOP 2001—Object-Oriented Programming, LNCS, vol. 2072, pp. 236-255 (Jun. 21, 2001).

Askarov et al., Predictive Black-Box Mitigation of Timing Channels, Proceedings of the 17th ACM conference on Computer and communications security, pp. 297-307, Oct. 2010.

B. Vattikonda, Eliminating fine grained timers in Xen, CCSW '11 Proceedings of the 3rd ACM workshop on Cloud computing security workshop, Sep. 2011.

C. Percival, Cache missing for fun and profit. Presented at BSDCan 2005, May 2005.

Kiyavash, N., "Timing Side Channels in Adversarial Networks", MURI Seminars, Department of Industrial and Enterprise Systems Engineering, University of Illinois at Urbana-Champaign, Mar. 2011.

http://code.google.com/p/jrfonseca/wiki/Gprof2Dot updated May 29, 2013.

http://www.computerworld.com/s/article/9137507/Researchers_find_a_new_way_to_attack_the_cloud?taxonomyId=172&pageNumber=2, Sep. 3, 2009.

http://www.eweek.com/c/a/Midmarket/Cloud-Computing-Growth-Hampered-by-Cost-Security-Concerns-Survey-482393/ Jul. 22, 2011.

Peng Li et al., StopWatch: Toward "differentially private" timing for cloud executions, Technical Report TR11-010, Department of Computer Science, University of North Carolina at Chapel Hill, Dec. 2011.

Ristenpart et al., Hey, you, get off of my cloud: exploring information leakage in third-party compute clouds, in Proceedings of the 16th ACM conference on Computer and communications security, pp. 199-212. Nov. 2009.

S. Schinzel, An Efficient Mitigation Method for Timing Side Channels on the Web, International Workshop on Constructive Side-Channel Analysis and Secure Design, Feb. 2011.

Tromer et al., Efficient cache attacks on AES, and countermeasures, International Association for Cryptologic Research, Jun. 2009.

Weiss et al., A Cache Timing Atack on AES in Virualzaton Environments, Lecture Notes in Computer Science 14th International Conference on Financial Cryptography and Data Security (Financial Crypto 2012), Feb.-Mar. 2012.

Zhou et al., "Security and Privacy in Cloud Computing: A Survey." In 2010 Sixth International Conference on Semantics Knowledge and Grid (SKG), 105-112. IEEE, Nov. 2010.

International Search Report and Written Opinion for PCT/US13/21603 filed Jan. 15, 2013, mailed Mar. 22, 2013.

* cited by examiner

FUNCTION-TARGETED VIRTUAL MACHINE SWITCHING

CROSS-REFERENCE TO RELATED APPLICATION

This application is the U.S. National Stage filing under 35 U.S.C. §371 of PCT Application No. PCT/US2013/021603 filed on Jan. 15, 2013. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

The move to "infrastructure as a service" cloud computing platforms brings flexible computing that realizes economies of scale. Cloud computing also brings with it new security challenges. To make better use of resources, cloud computing providers may multiplex several virtual machines from different clients on a single physical machine. This may open the danger of side channel attacks from malicious clients. In particular, side channel timing attacks use timers to glean information from the processing times of co-resident processes—for example, using the elapsed time for key hashing to determine properties of that key. Such attacks may steal keys from widely used encryption standards. The timing may also provide information on keystroke timing to extract passwords as well as count users, and the like. Timing may further be used to detect colocation with a target, one of the three steps to execute a datacenter attack. This may be done by observing the timing associated with various cache or branch hardware to detect signature computing patterns and timing.

As cloud computing platforms become more prevalent, new security challenges arise. Many cloud computing providers multiplex several virtual machines from different clients on a single physical machine, to take advantage of the power of modern processors, memory, and hardware architectures. However, such resource sharing may facilitate side-channel attacks, where a malicious process operating on shared hardware gather information about other, co-resident processes.

SUMMARY

The present disclosure generally describes techniques for function-targeted virtual machine switching.

According to some examples, a method is provided for function-targeted virtual machine switching in a datacenter. The method may include selecting at least one function implemented to execute on a first virtual machine, adjusting a virtual machine switching probability associated with the at least one function, and when the at least one function is executing on the first virtual machine, switching from the first virtual machine to a second virtual machine based on the adjusted virtual machine switching probability.

According to other examples, a virtual machine manager is provided for function-targeted virtual machine switching in a datacenter. The virtual machine manager may include a profiling module configured to profile a process executing on a first virtual machine and a processing module. The processing module may be configured to select at least one function included in the process, adjust a virtual machine switching probability associated with the at least one function, and when the at least one function is executing on the first virtual machine, switch from the first virtual machine to a second virtual machine based on the adjusted virtual machine switching probability.

According to further examples, a cloud-based datacenter is provided that employs function-targeted virtual machine switching. The datacenter may include multiple virtual machines operable to be executed on one or more physical machines, and a datacenter controller. The datacenter controller may be configured to select at least one function included on a first virtual machine in the multiple virtual machines, adjust a virtual machine switching probability associated with the at least one function, and when the at least one function is executing on the first virtual machine, switch from the first virtual machine to a second virtual machine based on the adjusted virtual machine switching probability.

According to yet further examples, a computer readable medium may store instructions for function-targeted virtual machine switching in a datacenter. The instructions may include selecting at least one function implemented to execute on a first virtual machine, adjusting a virtual machine switching probability associated with the at least one function, and when the at least one function is executing on the first virtual machine, switching from the first virtual machine to a second virtual machine based on the adjusted virtual machine switching probability.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to function-targeted virtual machine switching.

Briefly stated, technologies are generally described for function-targeted virtual machine switching. In some examples, function usage times on a virtual machine (VM) may be profiled by a virtual machine manager (VMM) and used to manage VM switching in order to preferentially switch VMs during specific targeted functions. The targeted functions and/or VM switching preferences may be adjusted over time in order to provide switching unpredictability, for example to frustrate side-channel attackers by forcing the attackers to gather data for much longer periods of time (e.g., weeks or months) if they want to detect or attack.

Figure 1:
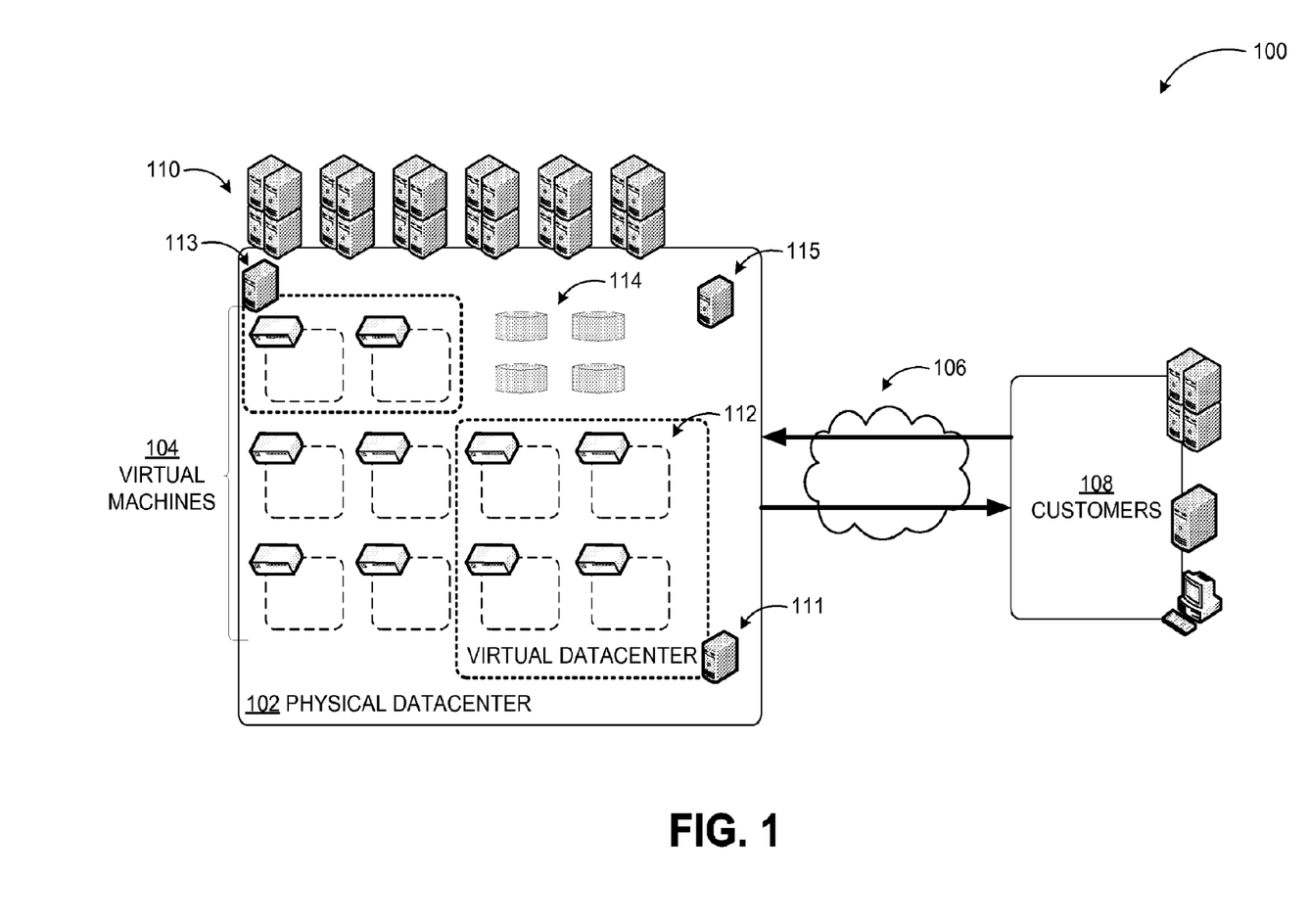
FIG. 1 illustrates an example datacenter-based system where function-targeted virtual machine switching may be implemented.

FIG. 1 illustrates an example datacenter-based system where function-targeted virtual machine switching may be implemented, arranged in accordance with at least some embodiments described herein.

As shown in a diagram 100, a physical datacenter 102 may include one or more physical servers 110, 111, 113 and 115, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machine 104 and/or the virtual datacenter 112 may be configured to provide cloud-related data/computing services 114 such as various applications, data storage, data processing, or comparable ones to a group of customers 108, such as individual users or enterprise customers, via a cloud 106.

Figure 2:
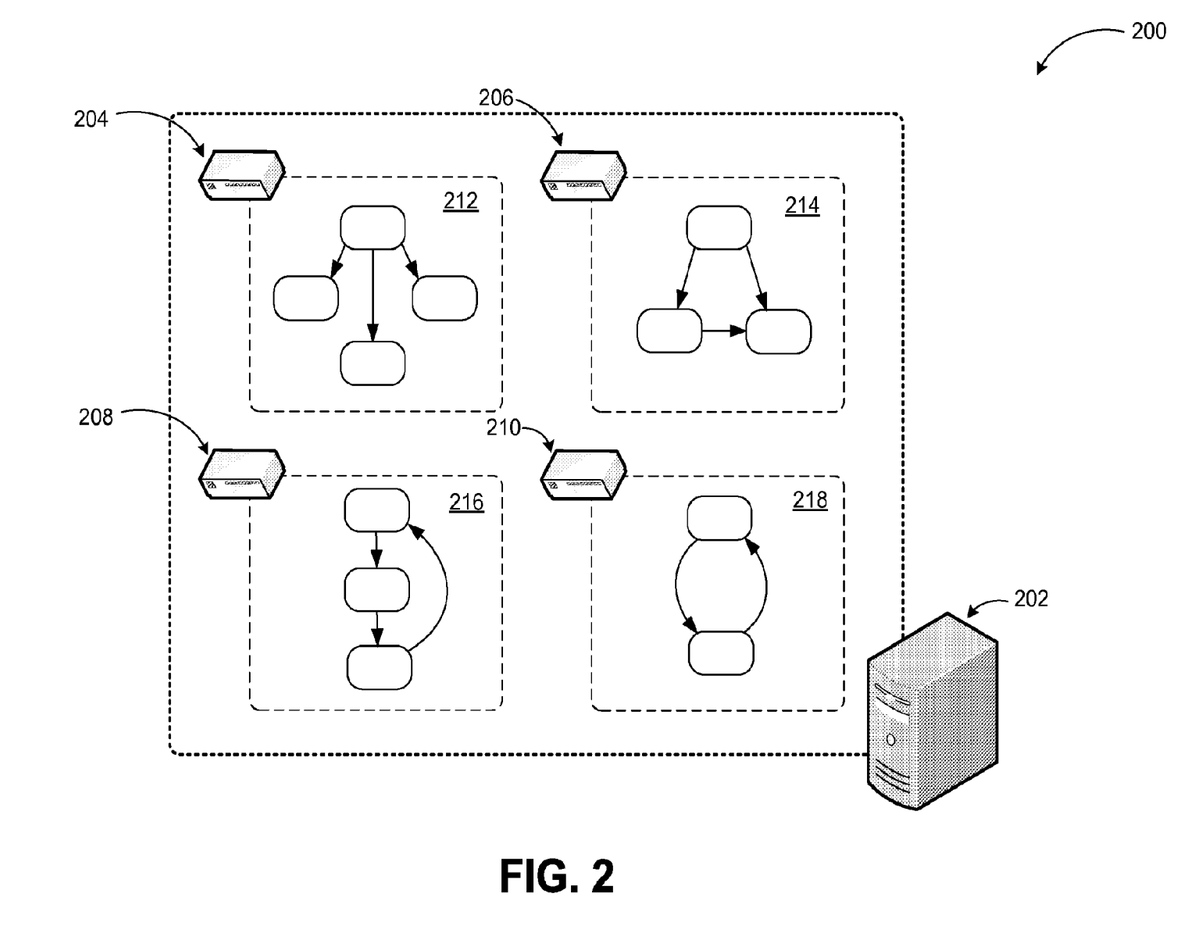
FIG. 2 illustrates an example system where the datacenter hardware of FIG. 1 may execute multiple virtual machines.

FIG. 2 illustrates an example system where the same datacenter hardware may execute multiple virtual machines, arranged in accordance with at least some embodiments described herein.

As shown in a diagram 200, multiple virtual machines 204, 206, 208, and 210 may operate on a single physical server 202 (similar to the physical server 111 in FIG. 1). Each of the virtual machines 204, 206, 208, and 210 may be configured to execute one or more processes. For example, a process 212 may execute on the virtual machine 204, a process 214 may execute on the virtual machine 206, a process 216 may execute on the virtual machine 208, and a process 218 may execute on the virtual machine 210. In some embodiments, each of the processes 212, 214, 216, and 218 may include one or more functions, and the execution of a process may involve the sequential execution of the functions included in that process. In some embodiments, the physical server 202 may be configured to execute the multiple virtual machines by rapidly switching its hardware between the virtual machines. For example, the physical server 202 may execute the virtual machine 204 (and execute its associated process 212) at one time, then rapidly switch to another virtual machine and execute its associated process. In this way, the hardware of the physical server 202 may be shared between the different virtual machines (and associated processes). In some embodiments, a virtual machine manager (VMM) may be responsible for implementing exactly how virtual machines are switched.

When multiple virtual machines, each executing a process or function, operate on the same physical hardware (e.g., the physical server 202), an attacker may be able to perform a side-channel attack on one or more of the executed processes/functions. For example, an attacker may provide a process (e.g., the process 218) configured to execute on one of the virtual machines operating on the physical server 202. Because multiple virtual machines (and processes) operate on the same hardware, an attacker may be able to use that process to observe physical parameters associated with the execution of other virtual machines and processes. For example, an attacker may use the process 218 to observe parameters associated with the execution of the virtual machines 204, 206, and 208, and/or the processes 212, 214, and 216. For example, the observable physical parameters may include the timing associated with cache input/output and other shared resources/hardware in the physical server 202.

Figure 3:
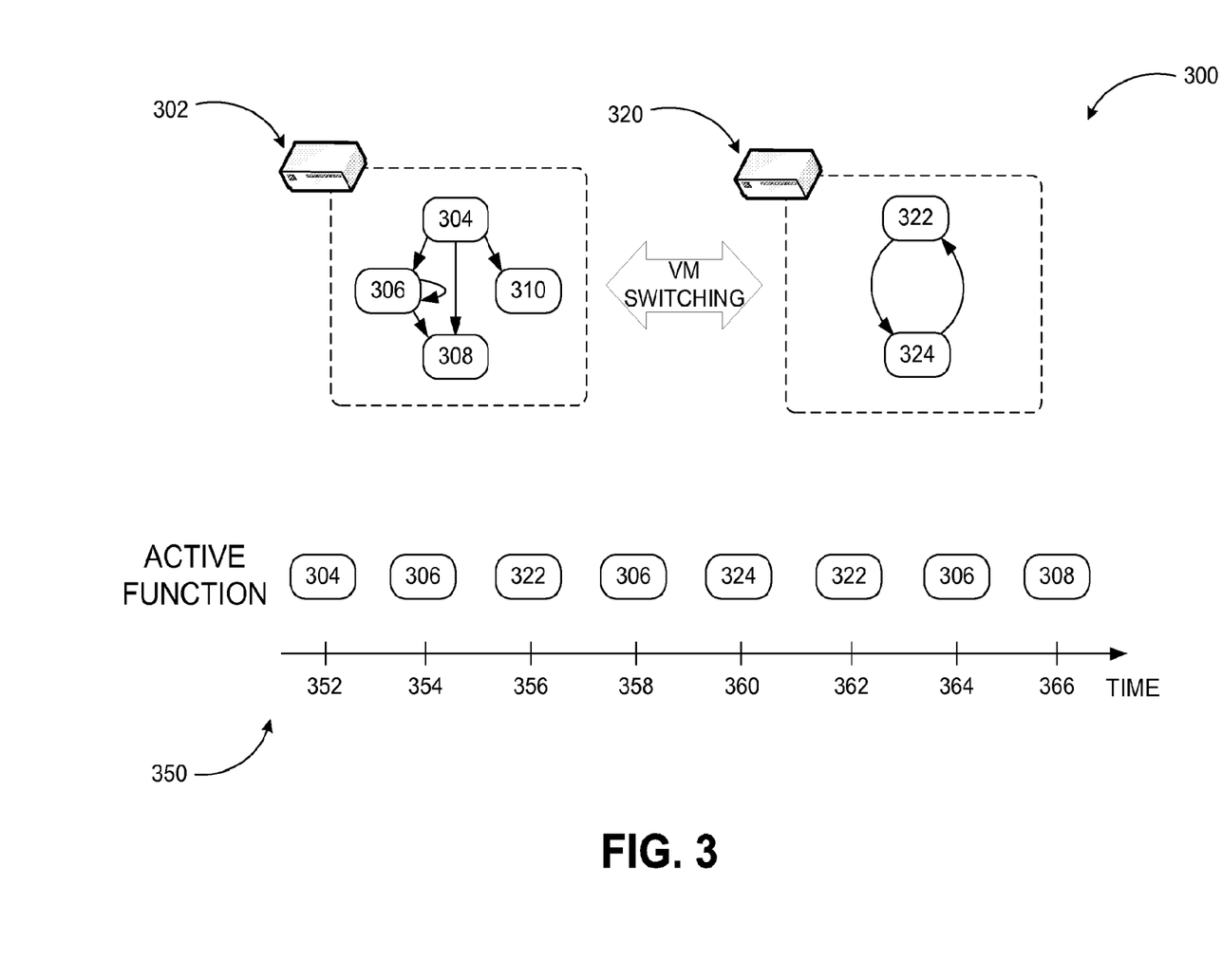
FIG. 3 illustrates operation of an example system with multiple virtual machines where side channel attacks may occur.

FIG. 3 illustrates the operation of an example system with multiple virtual machines where side channel attacks may occur, arranged in accordance with at least some embodiments described herein.

As shown in a diagram 300, a virtual machine 302 and a virtual machine 320 may be configured to execute on the same physical hardware (e.g., the physical server 202 in FIG. 2). The virtual machine 302 may execute a process having functions 304, 306, 308, and 310, whereas the virtual machine 320 may execute a process having functions 322 and 324. The physical hardware may be configured to switch between the virtual machine 302 and the virtual machine 320. For example, a timing chart 350 may depict the particular function that is expected for execution by a particular time. At a time 352, the hardware may execute function 304 (on the virtual machine 302). Subsequently, at a time 354, the execution of the function 304 may be completed, and the hardware may execute function 306 (on the same virtual machine 302).

At a next time 356, a virtual machine switch may occur, causing the hardware to execute the function 322 (on the virtual machine 320). The function 306 may have completed execution, or may have been interrupted by the virtual machine switch. Subsequently, at a time 358, another virtual machine switch may occur, in which a second instance of the function 306 may be executed (or, if it was interrupted previously, the same function 306 may be continued). Similar to the time 356, the function 322 may either have completed or been interrupted. At a later time 360, yet another virtual machine switch may occur, causing the hardware to execute the function 324. Subsequently, at a time 362, the hardware may complete execution of the function 324, and may continue executing (if interrupted) or begin executing another instance of the function 322 on the same virtual machine 320. Then, at a later time 364, another virtual machine switch may occur, and the hardware may continue executing (if interrupted) or execute a third instance of the function 306 on the virtual machine 302. The hardware may then complete execution of the third instance of the function 306 at a time 366 and begin executing the function 308 on the same virtual machine 302.

As depicted in the diagram 300, in some circumstances, virtual machine switching may occur between or during the execution of individual functions. In these circumstances, an attacker may be able to gather timing information about the individual functions. For example, suppose that the virtual machine 320 (and the functions 322 and 324) is associated with an attacker. The attacker may then be able to gain timing information about the function 306 on the virtual machine 302 (e.g., how long it takes to execute). For example, the attacker may be able to measure the elapsed time from the end of the execution of the function 322 at the time 356 and the beginning of the execution of the function 324 at the time 360. Over time, the attacker may be able to gather enough timing information statistics to compromise the data being handled by the function 306. For example, if the function 306 is associated with a cryptographic algorithm or key, an attacker may be able to use the gathered data to determine properties associated with the cryptographic algorithm/key and thereby compromise the cryptographic process.

Figure 4:
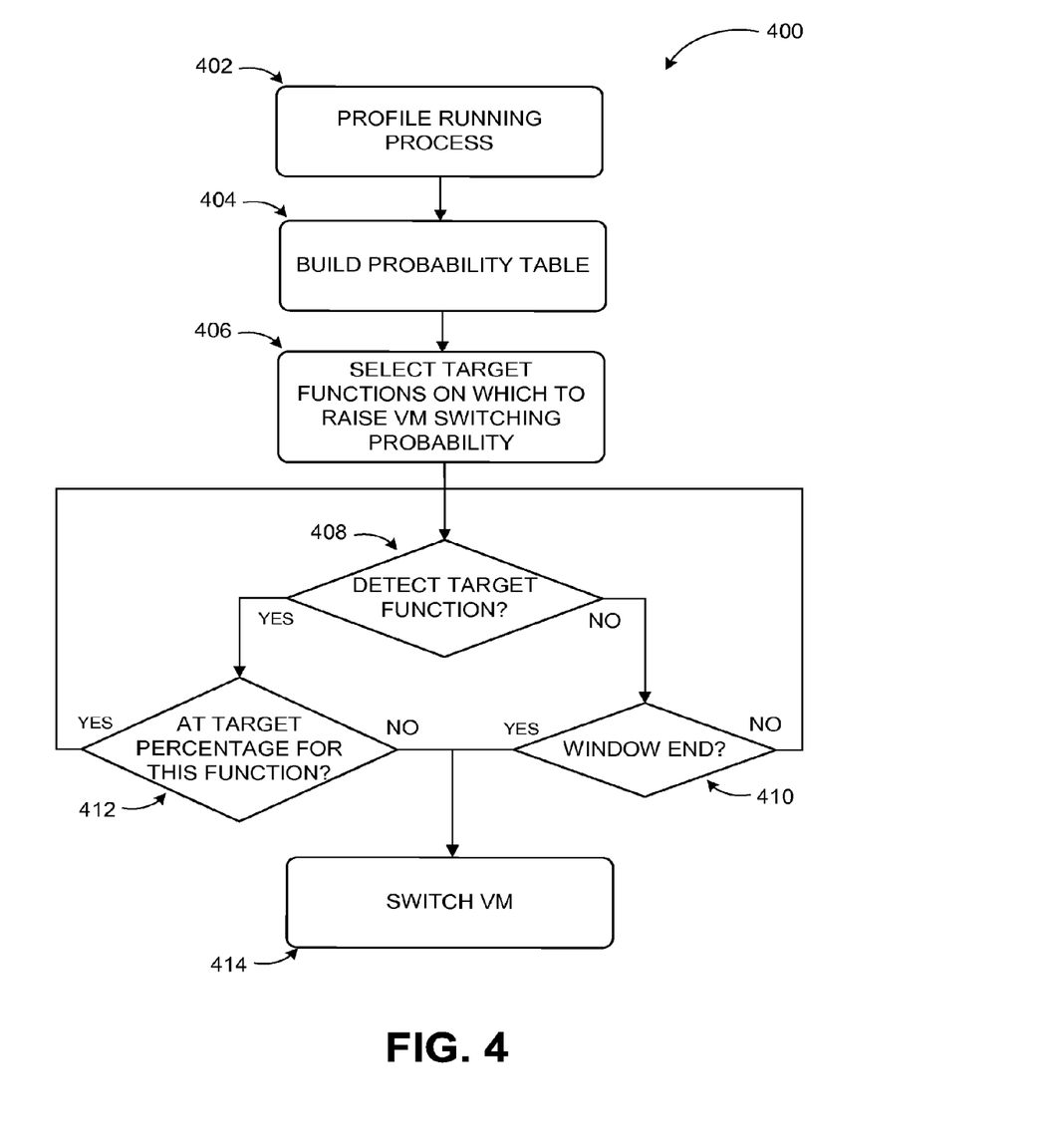
FIG. 4 illustrates an example process for implementing function-targeted virtual machine switching.

FIG. 4 illustrates an example process for implementing function-targeted virtual machine switching arranged in accordance with at least some embodiments described herein.

As depicted in a diagram 400, a process for implementing function-targeted virtual machine switching may begin with an operation 402, in which a running process (or a process that is to be executed) that is to be protected may be profiled by a VMM. In some embodiments, the profiling may involve identifying the particular functions, function flows (e.g., how functions transition between each other), and function timings that are associated with the running process. The identified function flows may include function paths, function transitions, probabilities for function transitions, and/or other information about how functions relate to each other in the running process. For example, if the process executing on the virtual machine 302 is profiled, the identified function flows may show that the function 304 may transition to (or call) the functions 306, 308, and/or 310. Similarly, the function 306 may transition to itself, or to the function 308. The identified function timings may indicate the amount of time (absolute or relative) each function typically operates for during the running process. For example, an identified function timing may indicate that a particular function runs for a particular amount of time in a given time duration (e.g., 100 µs in 1 ms) or for a particular proportion of the time (e.g., 10% of the time).

Subsequently, in an operation 404, the information gathered in the operation 402 may be used to build a probability table. In some embodiments, the probability table may include information about the individual functions that are associated with the running process and the probability that a particular function is being executed at a given time.

In a next operation 406, one or more target functions in the probability table built in the operation 404 may be selected for VM switching probability adjustment by the VMM. In some embodiments, the selected target functions may be those deemed most vulnerable or resistant to attack. For example, the functions may be selected based on a vulnerability table that lists the functions most vulnerable or resistant to attack. In some embodiments, the vulnerability table may be provided by the owner of the running process. The vulnerability table may also (or instead) be constructed by monitoring the running process for functions with specific formats (e.g., cryptographic functions) and/or functions that execute when high-value data is processed (e.g., credit card data).

Once the target function(s) have been selected as described above, virtual machine switching probabilities associated with the selected functions may be raised. In some embodiments, if VM switching is random, the VM switching probability associated with a target function may correlate to that function's probability of execution. Raising the VM switching probability of that function may allow the function's probability of execution to be masked from an attacker, or at least cause the attacker to spend more time gathering timing information. In some embodiments, a function's VM switching probability may instead be lowered.

In some embodiments, the VM switching probability adjustment may be based on a desired rate of probability change. This rate may be selected by a process owner, a datacenter VMM, or any other suitable entity, and may be based on the time an attacker might need to gather statistically-sufficient timing information for an attack. In some embodiments, a slowly-altering timing input representing the desired rate of probability change may be used to adjust the VM switching probability as a function of time. For example, the slowly-altering timing input may include an aperiodic pseudorandom function having minimum derivatives that meet the desired rate of probability change.

Once the target function(s) have been selected and the appropriate VM switching probabilities adjusted, the running process may be monitored by the VMM for target function(s). If a target function is detected at an operation 408, it may be determined if the target function has reached the VM switching probability target determined in the operation 406. If not, a VM switch may be performed at operation 414. The VM switch may occur while the target function is executing or after the target function has completed execution. In some embodiments, the operation 408 may detect a target operation 412 before it begins to execute, and the VM switch may also occur before the target operation begins to execute. If the target function has reached the VM switching probability target, the process may revert back to the operation 408.

On the other hand, if a target function has not been detected at the operation 408, it may be determined if a VM switch window has been reached in an operation 410. The VM switch window may be selected to impose a maximum time between VM switches, such that performance degradation due to VM switching probability adjustment is reduced or minimized. If the VM switch window has not been reached, the process may revert back to the operation 408. On the other hand, if it is determined that the VM switch window has been reached in the operation 410, a VM switch may be performed at operation 414. In some embodiments, the VM switch may be to another virtual machine configured to execute on the same hardware as the running process.

In some embodiments, the VM switch adjustment process described above may also be combined with periodic migration of the process to different hardware. For example, instead of (or in addition) to having the VM switch process switch between VMs on different hardware, the same VM may be moved to different hardware at the same datacenter or another datacenter. This may further confound the ability of an attacker to gather function information for a side-channel attack.

Figure 5:
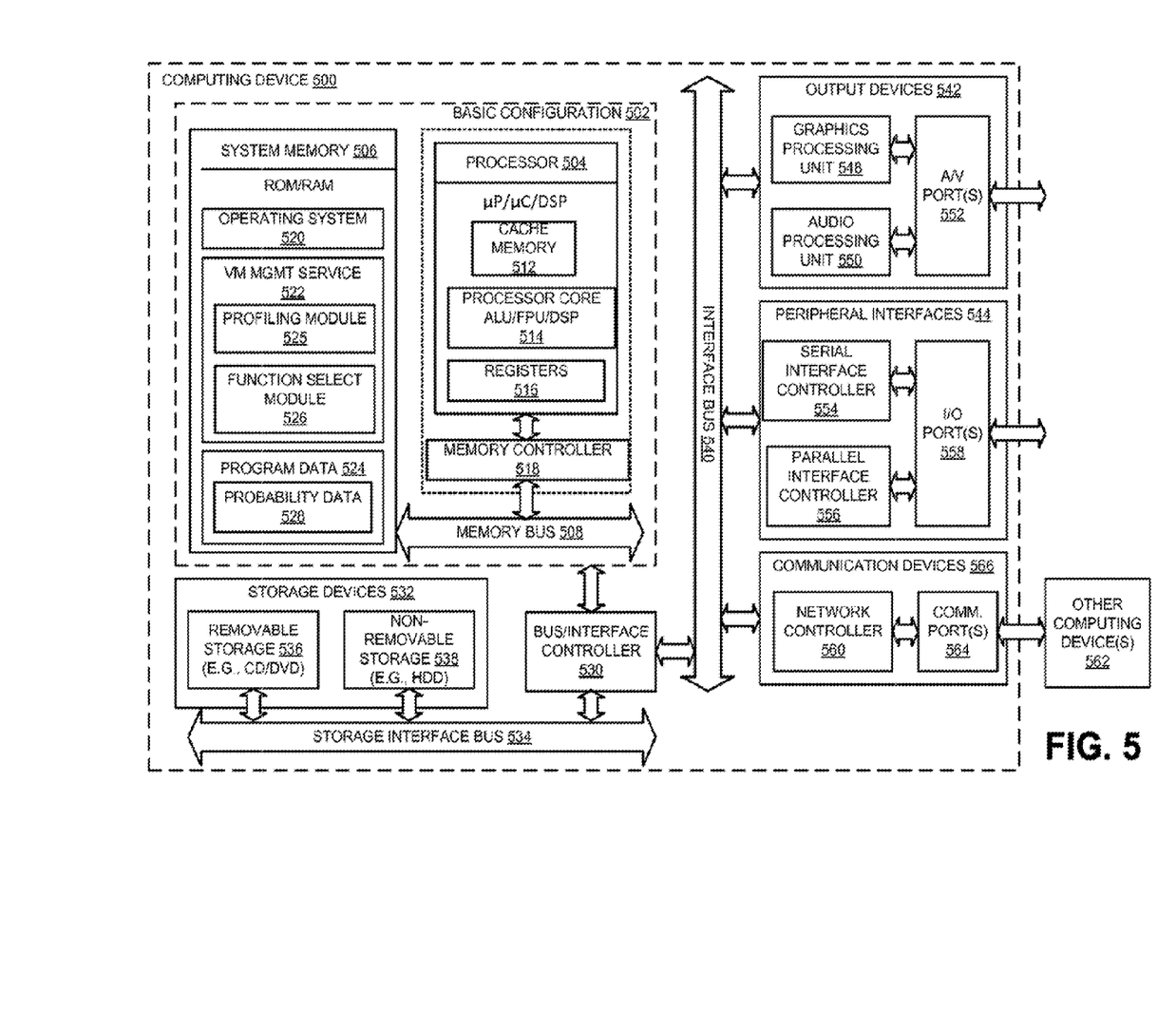
FIG. 5 illustrates a general purpose computing device, which may be used for function-targeted virtual machine switching.

FIG. 5 illustrates a general purpose computing device, which may be used for function-targeted virtual machine switching arranged in accordance with at least some embodiments described herein.

For example, the computing device 500 may be used to perform function-targeted virtual machine switching as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a virtual machine (VM) management service 522, and program data 524. The VM management service 522 may include a profiling module 525 and a function select module 526 for performing function-targeted virtual machine switching as described herein. The program data 524 may include, among other data, probability data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for function-targeted virtual machine switching. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
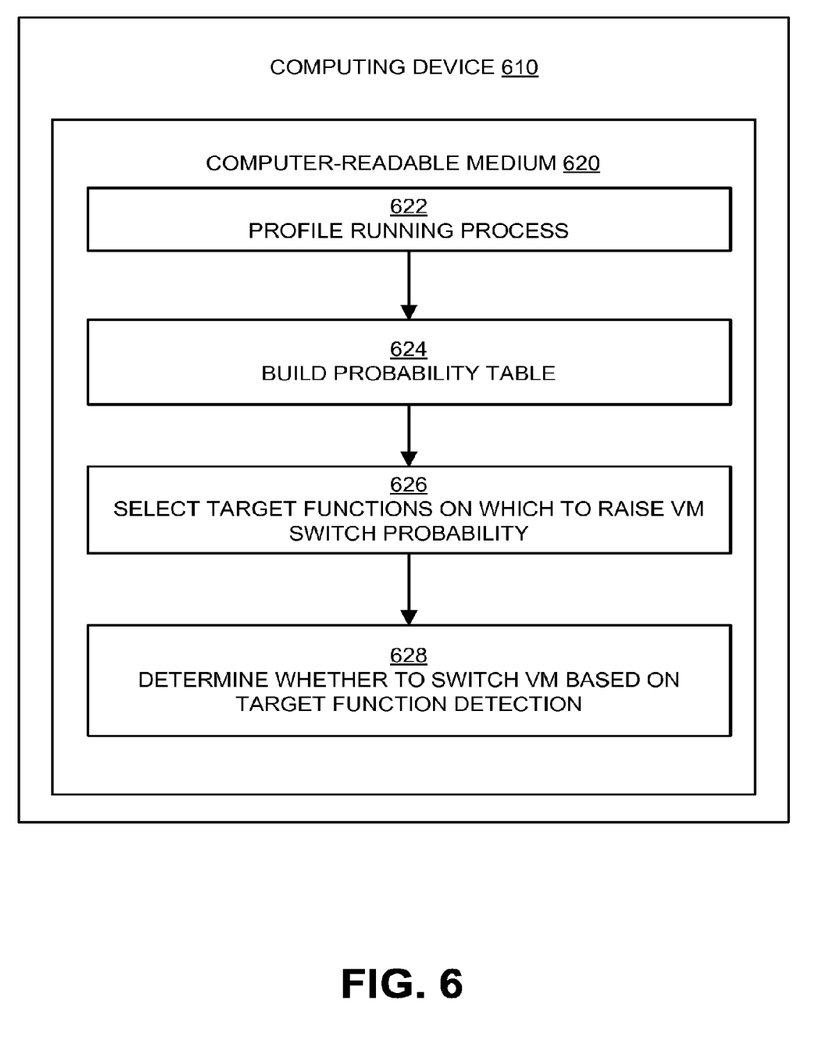
FIG. 6 is a flow diagram illustrating an example method for function-targeted virtual machine switching that may be performed by a computing device such as the computing device in FIG. 5.

FIG. 6 is a flow diagram illustrating an example method for function-targeted virtual machine switching that may be performed by a computing device such as the computing device in FIG. 5 arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for function-targeted virtual machine switching may begin at block 622, "PROFILE RUNNING PROCESS", where one or more processes operating on a virtual machine may be profiled by a VMM to identify functions, function flows, and function timings, as described above in relation to the operation 402 in the diagram 400.

Block 622 may be followed by block 624, "BUILD PROBABILITY TABLE", where the data gathered in the block 622 may be used to build a probability table by the VMM as described above in relation to the operation 404 in the diagram 400.

Block 624 may be followed by block 626, "SELECT TARGET FUNCTIONS ON WHICH TO RAISE VM SWITCH PROBABILITY", where one or more functions in the probability table built in the block 624 may be selected by the VMM for increased VM switching probability, as described above in relation to the operation 406 in the diagram 400. In some embodiments, the function selection may also be based on a vulnerability table. In some embodiments, the VM switching probability may instead be lowered.

Finally, block 626 may be followed by block 628, "DETERMINE WHETHER TO SWITCH VM BASED ON TARGET FUNCTION DETECTION", where detection of the target function(s) selected in the block 626 may inform whether a VM switch occurs or not, as described above in relation to the diagram 400. For example, a VM switch may occur if a target function has been detected but has not yet reached a target VM switching probability, or if a VM switch window has been reached.

Figure 7:
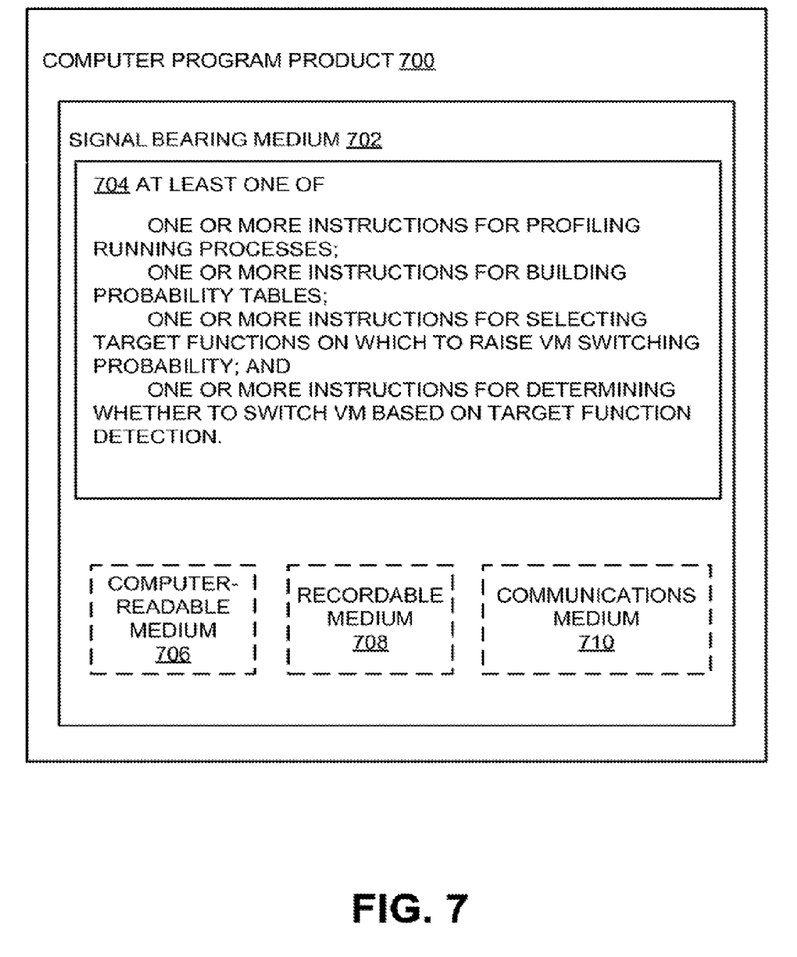
FIG. 7 illustrates a block diagram of an example computer program product, all arranged in accordance with at least some embodiments described herein.

FIG. 7 illustrates a block diagram of an example computer program product arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the VM 522 may undertake one or more of the tasks shown in FIG. 7 in response to the instructions 704 conveyed to the processor 504 by the medium 702 to perform actions associated with function-targeted virtual machine switching as described herein. Some of those instructions may include, for example, profiling running processes, building probability tables, selecting target functions on which to raise VM switching probability, and determining whether to switch VM based on target function detection, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method is provided for function-targeted virtual machine switching in a datacenter. The method may include selecting at least one function configured to execute on a first virtual machine, adjusting a virtual machine switching probability associated with the at least one function, and when the at least one function is executing on the first virtual machine, switching from the first virtual machine to a second virtual machine based on the adjusted virtual machine switching probability.

According to some embodiments, the method may further include profiling a process executing on the first virtual machine and building a probability table based on the profiling, where the probability table includes the virtual machine switching probability. The method may further include switching from the first virtual machine to the second virtual machine based on a virtual machine switch window. In some embodiments, the method may further include adjusting another virtual machine switching probability associated with another function configured to execute on the first virtual machine, and when the other function is executing on the first virtual machine, switching from the first virtual machine to another virtual machine based on the adjusted other virtual machine switching probability.

According to other embodiments, the method may further include adjusting the virtual machine switching probability based on a desired rate of probability change. The desired rate of probability change may be based on a time for obtaining statistically-sufficient data for a side-channel attack. The method may further include using a slow alteration input corresponding to the desired rate of probability change to adjust the virtual machine switching probability. The slow alteration input may include at least one aperiodic pseudo-random function having minimum derivatives that meet the desired rate of probability change.

According to further embodiments, the method may further include selecting the at least one function based on a vulnerability table and/or building the vulnerability table by monitoring for functions with specific formats and/or functions executing on the first virtual machine when high-value data is processed. The first virtual machine and the second virtual machine may execute on different servers and/or at different datacenters.

According to other examples, a virtual machine manager (VMM) is provided for function-targeted virtual machine switching in a datacenter. The VMM may include a profiling module configured to profile a process executing on a first virtual machine and a processing module. The processing module may be configured to select at least one function implemented in the process, adjust a virtual machine switching probability associated with the at least one function, and when the at least one function is executing on the first virtual machine, switch from the first virtual machine to a second virtual machine based on the adjusted virtual machine switching probability.

According to some embodiments, the processing module may be further configured to build a probability table based on the profiling, where the probability table includes the virtual machine switching probability. The processing module may be further configured to switch from the first virtual machine to the second virtual machine based on a virtual machine switch window. In some embodiments, the processing module may be further configured to adjust another virtual machine switching probability associated with another function configured to execute on the first virtual machine, and when the other function is executing on the first virtual machine, switch from the first virtual machine to another virtual machine based on the adjusted other virtual machine switching probability.

According to other embodiments, the processing module may be further configured to adjust the virtual machine switching probability based on a desired rate of probability change. The desired rate of probability change may be based on a time for obtaining statistically-sufficient data for a side-channel attack. The processing module may be further configured to use a slow alteration input corresponding to the desired rate of probability change to adjust the virtual machine switching probability. The slow alteration input may include at least one aperiodic pseudorandom function having minimum derivatives that meet the desired rate of probability change.

According to further embodiments, the processing module may be further configured to select the at least one function based on a vulnerability table and/or build the vulnerability table by monitoring for functions with specific formats and/or functions executing on the first virtual machine when high-value data is processed. The first virtual machine and the second virtual machine may execute on different servers and/or at different datacenters.

According to further examples, a cloud-based datacenter is provided that employs function-targeted virtual machine switching. The datacenter may include multiple virtual machines operable to be executed on one or more physical machines, and a datacenter controller. The datacenter controller may be configured to select at least one function configured to execute on a first virtual machine in the multiple virtual machines, adjust a virtual machine switching probability associated with the at least one function, and when the at least one function is executing on the first virtual machine, switch from the first virtual machine to a second virtual machine based on the adjusted virtual machine switching probability.

According to some embodiments, the datacenter controller may be further configured to profile a process executing on the first virtual machine and build a probability table based on the profiling, where the probability table includes the virtual machine switching probability. The datacenter controller may be further configured to switch from the first virtual machine to the second virtual machine based on a virtual machine switch window. In some embodiments, the datacenter controller may be further configured to adjust another virtual machine switching probability associated with another function configured to execute on the first virtual machine, and when the other function is executing on the first virtual machine, switch from the first virtual machine to another virtual machine based on the adjusted other virtual machine switching probability.

According to other embodiments, the datacenter controller may be further configured to adjust the virtual machine switching probability based on a desired rate of probability change. The desired rate of probability change may be based on a time for obtaining statistically-sufficient data for a side-channel attack. The datacenter controller may be further configured to use a slow alteration input corresponding to the desired rate of probability change to adjust the virtual machine switching probability. The slow alteration input may include at least one aperiodic pseudorandom function having minimum derivatives that meet the desired rate of probability change.

According to further embodiments, the datacenter controller may be further configured to select the at least one function based on a vulnerability table and/or build the vulnerability table by monitoring for functions with specific formats and/or functions executing on the first virtual machine when high-value data is processed. The first virtual machine and the second virtual machine may execute on different servers and/or at different datacenters.

According to yet further examples, a computer readable medium may store instructions for function-targeted virtual machine switching in a datacenter. The instructions may include selecting at least one function implemented to execute on a first virtual machine, adjusting a virtual machine switching probability associated with the at least one function, and when the at least one function is executing on the first virtual machine, switching from the first virtual machine to a second virtual machine based on the adjusted virtual machine switching probability.

According to some embodiments, the instructions may further include profiling a process executing on the first virtual machine and building a probability table based on the profiling, where the probability table includes the virtual machine switching probability. The instructions may further include switching from the first virtual machine to the second virtual machine based on a virtual machine switch window. In some embodiments, the instructions may further include adjusting another virtual machine switching probability associated with another function configured to execute on the first virtual machine, and when the other function is executing on the first virtual machine, switching from the first virtual machine to another virtual machine based on the adjusted other virtual machine switching probability.

According to other embodiments, the instructions may further include adjusting the virtual machine switching probability based on a desired rate of probability change. The desired rate of probability change may be based on a time for obtaining statistically-sufficient data for a side-channel attack. The instructions may further include using a slow alteration input corresponding to the desired rate of probability change to adjust the virtual machine switching probability. The slow alteration input may include at least one aperiodic pseudorandom function having minimum derivatives that meet the desired rate of probability change.

According to further embodiments, the instructions may further include selecting the at least one function based on a vulnerability table and/or building the vulnerability table by monitoring for functions with specific formats and/or functions executing on the first virtual machine when high-value data is processed. The first virtual machine and the second virtual machine may execute on different servers and/or at different datacenters.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for function-targeted virtual machine switching in a datacenter, the method comprising:
   profiling a process executed on a first virtual machine that is being executed on a physical server;
   building a probability table based on the profiling, wherein the probability table includes information regarding one or more functions that are associated with the executed process and a virtual machine switching probability, wherein the one or more functions are included in the process and are executed sequentially as part of the execution of the process;
   selecting at least one function from the probability table, configured to execute on the first virtual machine;
   adjusting the virtual machine switching probability associated with the at least one selected function using a slow alteration input corresponding to a desired rate of probability change, wherein the slow alteration input includes at least one aperiodic pseudorandom function having minimum derivatives that meet the desired rate of probability change;
   in response to a detection that the at least one selected function is executing on the first virtual machine, switching from the first virtual machine to a second virtual machine that is being executed on a same physical server as the first virtual machine based on the adjusted virtual machine switching probability to prevent an attack; and
   executing, on the second virtual machine, one or more functions configured to execute on the second virtual machine.

2. The method of claim 1, further comprising, switching from the first virtual machine to the second virtual machine based on a virtual machine switch window.

3. The method of claim 1, further comprising:
   adjusting another virtual machine switching probability associated with another function configured to execute on the first virtual machine; and
   when the other function is executing on the first virtual machine, switching from the first virtual machine to another virtual machine based on the adjusted other virtual machine switching probability.

4. The method of claim 1, wherein the desired rate of probability change is based on a time for obtaining statistically-sufficient data for a side-channel attack.

5. The method of claim 1, further comprising selecting the at least one function based on a vulnerability table that lists functions that are vulnerable or resistant to an attack.

6. The method of claim 5, further comprising building the vulnerability table by monitoring for at least one of functions with specific formats and functions executing on the first virtual machine when high-value data is processed.

7. A virtual machine manager (VMM) for function-targeted virtual machine switching in a datacenter, the VMM comprising:
   a profiling module configured to profile a process executed on a first virtual machine that is being executed on a physical server; and
   a processing module configured to:
      build a probability table based on the profiling, wherein the probability table includes information regarding one or more functions that are associated with the executed process and a virtual machine switching probability, wherein the one or more functions are included in the process and are executed sequentially as part of the execution of the process;
      select at least one function from the probability table;
      adjust the virtual machine switching probability associated with the at least one selected function using a slow alteration input corresponding to a desired rate of probability change, wherein the slow alteration input includes at least one aperiodic pseudorandom function having minimum derivatives that meet the desired rate of probability change;
      in response to a detection that the at least one selected function is executing on the first virtual machine, switch from the first virtual machine to a second virtual machine that is being executed on a same physical server as the first virtual machine based on the adjusted virtual machine switching probability to prevent an attack; and
      execute, on the second virtual machine, one or more functions configured to execute on the second virtual machine.

8. The VMM of claim 7, wherein the desired rate of probability change is based on a time for obtaining statistically-sufficient data for a side-channel attack.

9. The VMM of claim 7, wherein the first virtual machine and the second virtual machine execute on different physical servers.

10. The VMM of claim 9, wherein the first virtual machine and the second virtual machine execute at different datacenters.

11. A cloud-based datacenter configured to employ function-targeted virtual machine switching, the datacenter comprising:
   a plurality of virtual machines; and a physical server configured to execute at least a first virtual machine and a second virtual machine in the plurality of virtual machines, the physical server comprising:
a memory; and
a processor coupled to the memory, wherein the processor comprises:
a profiling module configured to:
profile a process executed on the first virtual machine; and
build a probability table based on the profiling, wherein the probability table includes information regarding one or more functions that are associated with the executed process and a virtual machine switching probability, wherein the one or more functions are included in the process and are executed sequentially as part of the execution of the process; and
a function select module configured to:
select at least one function from the probability table, configured to execute on the first virtual machine;
adjust the virtual machine switching probability associated with the at least one selected function using a slow alteration input corresponding to a desired rate of probability change, wherein the slow alteration input includes at least one aperiodic pseudorandom function having minimum derivatives that meet the desired rate of probability change;
in response to a detection that the at least one selected function is executing on the first virtual machine, switch from the first virtual machine to the second virtual machine based on the adjusted virtual machine switching probability to prevent an attack; and
execute, on the second virtual machine, one or more functions configured to execute on the second virtual machine.

12. The datacenter of claim 11, wherein the function select module is further configured to switch from the first virtual machine to the second virtual machine based on a virtual machine switch window.

13. The datacenter of claim 11, wherein the function select module is further configured to:
adjust another virtual machine switching probability associated with another function configured to execute on the first virtual machine; and
in response to a detection that the other function is executing on the first virtual machine, switch from the first virtual machine to another virtual machine based on the adjusted other virtual machine switching probability.

14. The datacenter of claim 11, wherein the desired rate of probability change is based on a time required to obtain statistically-sufficient data for a side-channel attack.

15. The datacenter of claim 11, wherein the function select module is further configured to select the at least one function based on a vulnerability table.

16. The datacenter of claim 15, wherein the function select module is further configured to build the vulnerability table by monitoring for at least one of functions with specific formats and functions executing on the first virtual machine when high-value data is processed.

* * * * *

UNITED STATES PATENT AND TRADEMARK OFFICE
CERTIFICATE OF CORRECTION

PATENT NO.       : 9,304,795 B2
APPLICATION NO.  : 13/977670
DATED            : April 5, 2016
INVENTOR(S)      : Kruglick Page 1 of 1

It is certified that error appears in the above-identified patent and that said Letters Patent is hereby corrected as shown below:

In the specification

Column 1, Line 9, delete "§371" and insert -- § 371 --, therefor.

In the claims

Column 16, Line 1, Claim 2, delete "further comprising," and insert -- further comprising --, therefor.

Signed and Sealed this
Twenty-eighth Day of June, 2016

Michelle K. Lee
*Director of the United States Patent and Trademark Office*